(12) United States Patent
Kim et al.

(10) Patent No.: US 10,741,809 B2
(45) Date of Patent: Aug. 11, 2020

(54) VEHICLE BATTERY CASE

(71) Applicants: Hyundai Motor Company, Seoul (KR); Kia Motors Corporation, Seoul (KR)

(72) Inventors: Min Wook Kim, Gyeonggi-do (KR); Beom Joo Kwon, Gyeonggi-do (KR); Yoon Cheol Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/109,094

(22) Filed: Aug. 22, 2018

(65) Prior Publication Data

US 2019/0334144 A1 Oct. 31, 2019

(30) Foreign Application Priority Data

Apr. 26, 2018 (KR) .................. 10-2018-0048228

(51) Int. Cl.
| | | |
|---|---|---|
| *B60R 16/04* | (2006.01) | |
| *H01M 2/10* | (2006.01) | |
| *B60K 1/04* | (2019.01) | |
| *B62D 25/20* | (2006.01) | |
| *B23K 26/21* | (2014.01) | |
| *B23K 20/12* | (2006.01) | |

(52) U.S. Cl.
CPC ......... *H01M 2/1083* (2013.01); *B23K 20/122* (2013.01); *B23K 26/21* (2015.10); *B60K 1/04* (2013.01); *B60R 16/04* (2013.01); *B62D 25/20* (2013.01); *H01M 2/1077* (2013.01); *B60G 2300/50* (2013.01); *B60K 2001/0438* (2013.01); *H01M 2220/20* (2013.01)

(58) Field of Classification Search
CPC ........ H01M 2/00; H01M 2/10; H01M 2/1016; H01M 2/1072; H01M 2/1083; H01M 2/1077; B23K 20/12; B23K 20/122; B23K 26/21; B62D 25/20; B60R 16/04; B60K 1/04; B60K 1/00; B60K 2001/0438; B60K 2001/0416
See application file for complete search history.

(56) References Cited

U.S. PATENT DOCUMENTS

| | | | | |
|---|---|---|---|---|
| 5,390,754 A | * | 2/1995 | Masuyama | ............. B60K 1/04 180/68.5 |
| 5,501,289 A | * | 3/1996 | Nishikawa | ............. B60K 1/04 180/68.5 |

(Continued)

FOREIGN PATENT DOCUMENTS

| | | |
|---|---|---|
| JP | H11213976 A | 8/1999 |
| JP | 5970825 B2 | 8/2016 |

(Continued)

*Primary Examiner* — James M Dolak
(74) *Attorney, Agent, or Firm* — Mintz Levin Cohn Ferris Glovsky and Popeo, P.C.; Peter F. Corless

(57) ABSTRACT

A vehicle battery case is provided. The battery case includes a lower panel and at least one transverse member that is disposed on the lower panel to increase transverse rigidity. Additionally, at least one longitudinal member is disposed on the lower panel to increase longitudinal rigidity, and a sidewall member is attached to an upper surface of the lower panel along a rim of the lower panel.

8 Claims, 5 Drawing Sheets

(56) References Cited

U.S. PATENT DOCUMENTS

| | | | | |
|---|---|---|---|---|
| 5,558,949 | A * | 9/1996 | Iwatsuki | H01M 2/1083 |
| | | | | 180/68.5 |
| 6,085,854 | A * | 7/2000 | Nishikawa | B60K 1/04 |
| | | | | 180/68.5 |
| 7,610,978 | B2 * | 11/2009 | Takasaki | B60K 1/04 |
| | | | | 180/68.5 |
| 7,749,644 | B2 * | 7/2010 | Nishino | B60K 1/04 |
| | | | | 429/100 |
| 7,931,105 | B2 * | 4/2011 | Sato | B60K 1/04 |
| | | | | 180/68.5 |
| 7,997,368 | B2 * | 8/2011 | Takasaki | B60K 1/04 |
| | | | | 180/68.5 |
| 8,511,412 | B2 * | 8/2013 | Kawaguchi | H01M 2/1083 |
| | | | | 180/68.5 |
| 8,863,878 | B2 * | 10/2014 | Shirooka | B60K 1/04 |
| | | | | 180/68.5 |
| 8,936,125 | B2 * | 1/2015 | Nakamori | B60K 1/04 |
| | | | | 180/68.5 |
| 9,012,056 | B2 * | 4/2015 | Lim | B60K 1/04 |
| | | | | 429/120 |
| 9,236,591 | B2 * | 1/2016 | Watanabe | H01M 2/1077 |
| 9,428,040 | B2 * | 8/2016 | Shibata | B60K 1/00 |
| 9,758,028 | B2 * | 9/2017 | Ikeda | B60K 1/04 |
| 9,764,629 | B2 * | 9/2017 | Schmalzrieth | B60K 1/04 |
| 10,336,211 | B2 * | 7/2019 | Kobayashi | H01M 2/1072 |
| 10,347,956 | B2 * | 7/2019 | Inoue | H01M 10/625 |
| 10,358,048 | B2 * | 7/2019 | Hara | B60L 50/64 |
| 10,367,241 | B2 * | 7/2019 | Enning | H01M 10/613 |
| 10,374,270 | B2 * | 8/2019 | Drabon | H01M 2/1083 |
| 10,377,216 | B2 * | 8/2019 | Hitz | B60K 1/04 |
| 10,464,406 | B2 * | 11/2019 | Kawabe | B62D 25/20 |
| 10,522,798 | B2 * | 12/2019 | Oshiba | H01M 10/6563 |
| 10,529,967 | B2 * | 1/2020 | Jung | H01M 2/1094 |
| 10,559,796 | B2 * | 2/2020 | Olfermann | H01M 2/1094 |
| 10,593,915 | B2 * | 3/2020 | Weber | H01M 2/1072 |
| 10,594,008 | B2 * | 3/2020 | Curfew | H01M 12/02 |
| 10,615,385 | B2 * | 4/2020 | Takahashi | H01M 2/1077 |
| 10,622,599 | B2 * | 4/2020 | Choo | H01M 2/206 |
| 10,622,606 | B2 * | 4/2020 | Keller | H01M 2/1094 |
| 10,622,663 | B2 * | 4/2020 | Yu | H01M 10/0413 |
| 2014/0329125 | A1 * | 11/2014 | Miyanaga | B60R 13/0861 |
| | | | | 429/100 |

FOREIGN PATENT DOCUMENTS

| | | |
|---|---|---|
| KR | 10-1219836 B1 | 1/2013 |
| KR | 2014-0044710 A | 4/2014 |

\* cited by examiner

VEHICLE BATTERY CASE

CROSS-REFERENCE TO RELATED APPLICATION

This application claims the priority benefit of Korean Patent Application No. 10-2018-0048228, filed on Apr. 26, 2018, the disclosure of which is incorporated herein by reference.

BACKGROUND

1. Field of the Invention

The present invention relates to a vehicle battery case, and more particularly, to a vehicle battery case that achieves high rigidity with a reduction in the weight thereof.

2. Description of the Related Art

Due to high oil prices and carbon dioxide regulations, the development of environmentally friendly vehicles capable of replacing conventional internal combustion engine vehicles is actively underway. Pure electric vehicles or hybrid vehicles are being commercialized and released, or are in the process of being commercialized by automobile manufacturers. For an environmentally friendly vehicle that requires a battery to be charged, there is a continued demand from customers for a decreased charging time and an increased driving distance on a single charge. Since the driving distance of an environmentally friendly vehicle is inversely correlated with the weight of the vehicle, a reduction in the weight of the vehicle is becoming an issue for such an environmentally friendly vehicle.

However, a conventional battery case uses a steel part that is press-molded to be capable of bearing the weight of a battery, or is manufactured by insert-molding a steel reinforcement into a plastic composite material. In addition, to secure the rigidity and durability of the case, the use of a steel material having a sufficient thickness has been required, and a mounting bracket or the like has to be separately mounted to the case, which increases the overall weight of the battery case. Accordingly, the total weight of the vehicle is increased, and as a result, the driving distance of the vehicle is shortened.

Details described as the background art are intended merely for the purpose of promoting the understanding of the background of the present invention and should not be construed as an acknowledgment of the prior art that is not known to those of ordinary skill in the art.

SUMMARY

The present invention provides a vehicle battery case, which is formed of an aluminum material, thus enabling a reduction in the overall weight thereof, and which may include at least one transverse member for increasing transverse rigidity and at least one longitudinal member for increasing longitudinal rigidity, thus realizing an increase in the rigidity thereof.

In accordance with an aspect of the present invention, a battery case for a vehicle may include a lower panel, at least one transverse member disposed on the lower panel to increase transverse rigidity, at least one longitudinal member disposed on the lower panel to increase longitudinal rigidity, and a sidewall member attached to an upper surface of the lower panel along a rim of the lower panel.

The transverse member and the longitudinal member may define a battery accommodation space therebetween, and the sidewall member may have an upper end coupled to an underside of a floor of the vehicle. The battery case may further include an auxiliary transverse member disposed at a position spaced apart from the battery accommodation space by a predetermined distance towards a rear end of the vehicle, and auxiliary longitudinal members formed between the battery accommodation space and the auxiliary transverse member and between the battery accommodation space and the sidewall member.

The longitudinal member may be disposed above the transverse member. Additionally, longitudinal member and the transverse member may be coupled to each other via metal inert gas (MEG) welding. The sidewall member may include a rim portion attached along the rim of the lower panel and having a predetermined height, a first rigid member attached to at least a portion of a longitudinal side of the rim portion, and a second rigid member attached to at least a portion of a transverse side of the rim portion. The first rigid member and the second rigid member may be coupled to the rim portion via MIG welding. The lower panel and the sidewall member may be coupled to each other via friction stir welding (FSW). At least one of the lower panel, the transverse member, the longitudinal member, and the sidewall member may be formed of an aluminum material.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a vehicle battery case according to an exemplary embodiment of the present invention will be described with reference to the accompanying drawings.

Figure 1:
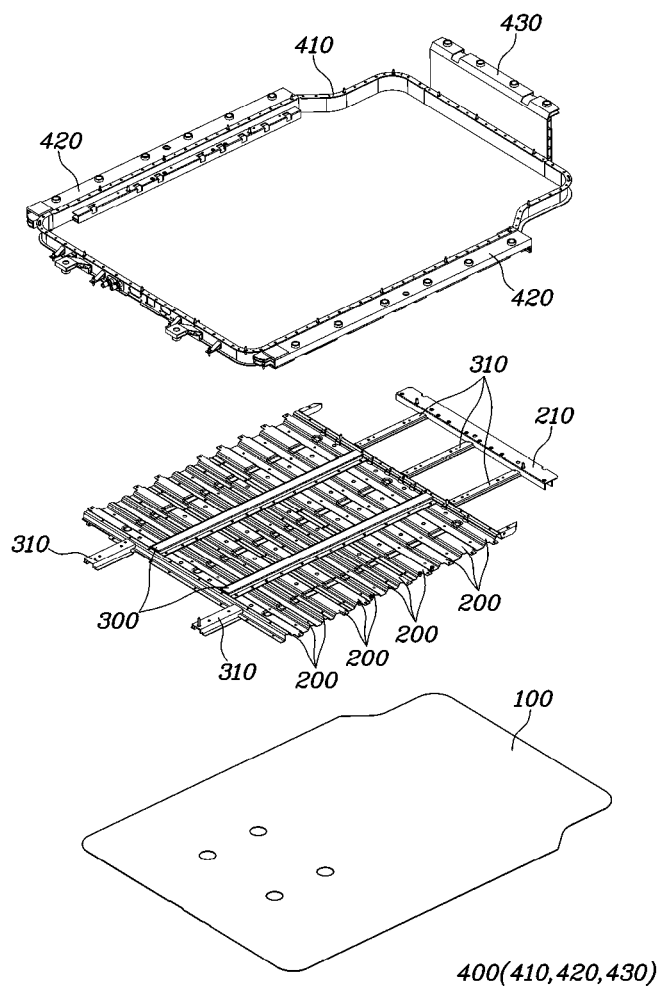
FIG. 1 is a detailed view illustrating a vehicle battery case according to an exemplary embodiment of the present invention.
Figure 2:
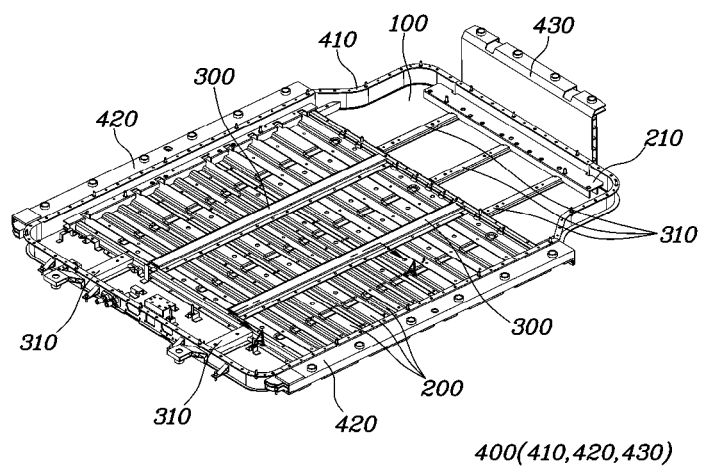
FIG. 2 is a perspective view illustrating the vehicle battery case according to the exemplary embodiment of the present invention.
Figure 3:
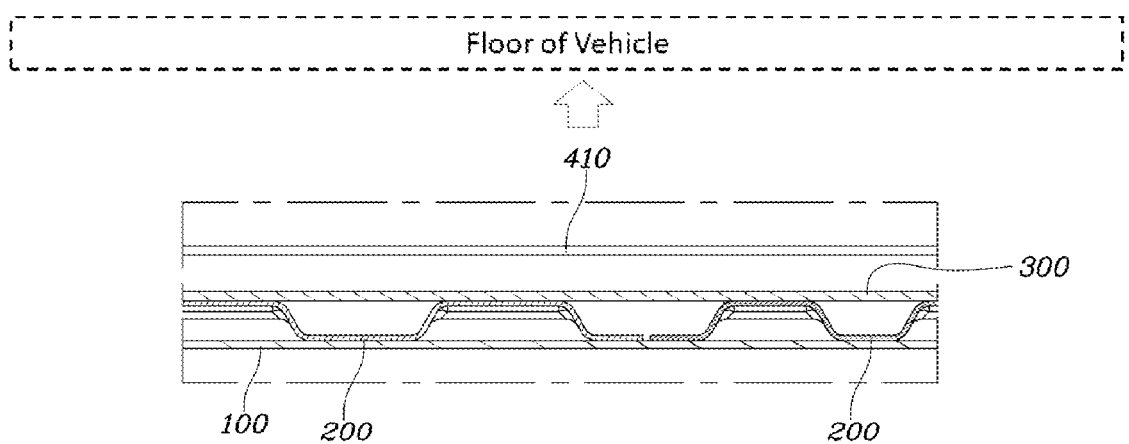
FIG. 3 is a cross-sectional view taken along line A-A' of FIG. 2 according to the exemplary embodiment of the present invention.
Figure 4:
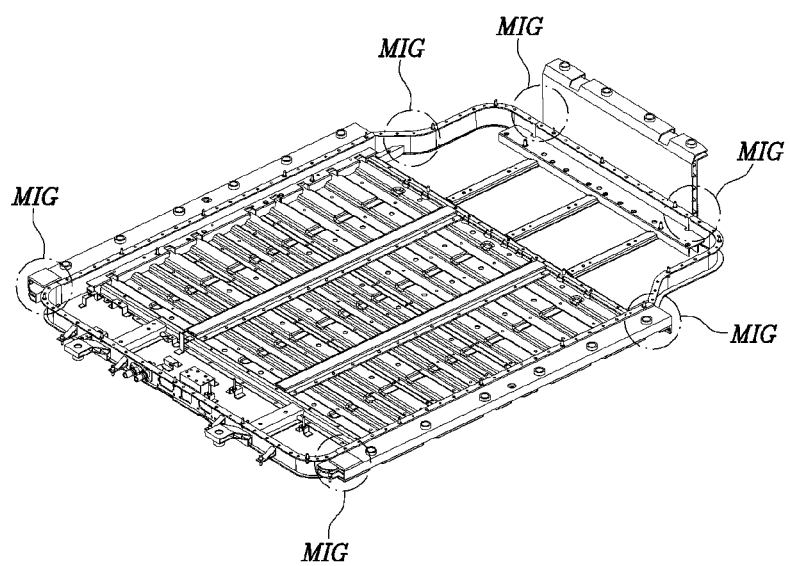
FIG. 4 is a view illustrating the state in which a first rigid member and a second rigid member of a sidewall member are coupled to a rim portion via MIG welding in the vehicle battery case according to the exemplary embodiment of the present invention.
Figure 5:
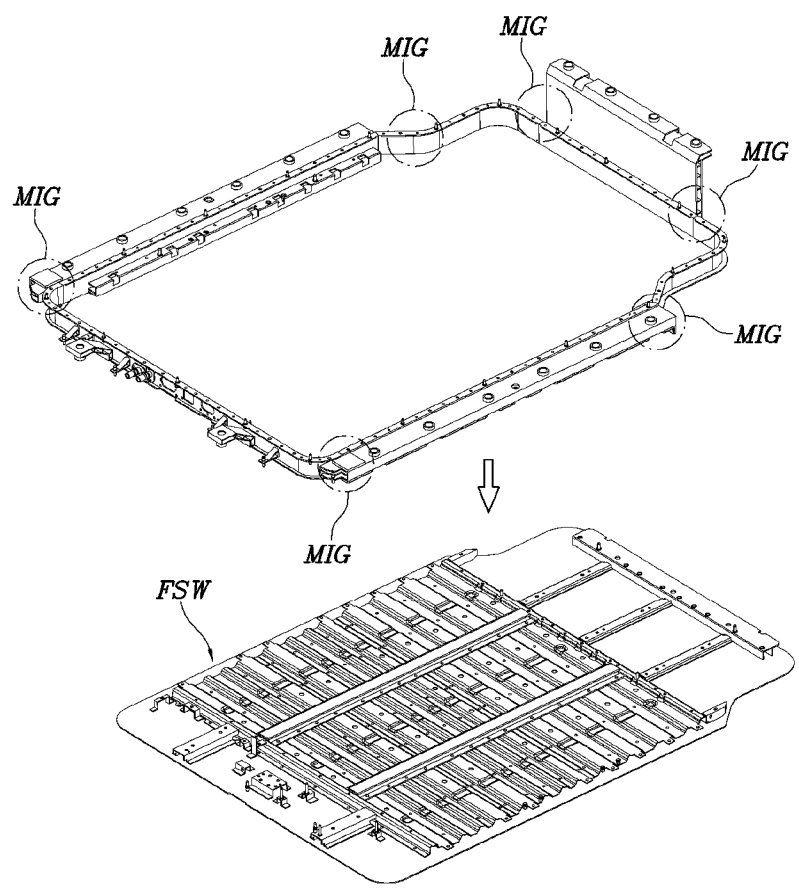
FIG. 5 is a view illustrating the state in which a lower panel and the sidewall member are coupled to each other via FSW in the vehicle battery case according to the exemplary embodiment of the present invention.

FIG. 1 is a detailed view illustrating a vehicle battery case according to an exemplary embodiment of the present invention, FIG. 2 is a perspective view illustrating the vehicle battery case according to the exemplary embodiment of the present invention, FIG. 3 is a cross-sectional view taken along line A-A' of FIG. 2, FIG. 4 is a view illustrating the state in which a first rigid member and a second rigid member of a sidewall member are coupled to a rim portion via MIG welding in the vehicle battery case according to the exemplary embodiment of the present invention, and FIG. 5 is a view illustrating the state in which a lower panel and the sidewall member are coupled to each other via FSW in the vehicle battery case according to the exemplary embodiment of the present invention.

As illustrated in FIGS. 1 and 2, the vehicle battery case according to the exemplary embodiment of the present invention may include a lower panel 100, a transverse member 200 disposed on the lower panel 100, a longitudinal member 300 disposed on the lower panel 100, and a sidewall member 400 attached to the upper surface of the lower panel 100 along the rim of the lower panel 100. In some exemplary embodiments, the vehicle battery case may further include an auxiliary transverse member 210 or an auxiliary longitudinal member 310.

In particular, at least one of the lower panel 100, the transverse member 200, the auxiliary transverse member 210, the longitudinal member 300, the auxiliary longitudinal member 310, and the sidewall member 400, which constitute the vehicle battery case, may be formed of an aluminum material. For a reduction in the weight of the battery case, all of the aforementioned members may be formed of an aluminum material. Accordingly, in the present invention, since the detailed constituent elements of the battery case described above may be formed of an aluminum material, the weight of the battery case may be further reduced compared to a conventional battery case formed of a steel material, and consequently, the driving distance of a vehicle may be increased.

The lower panel 100 may be formed of an aluminum material to have a flat panel shape, and the sidewall member 400 may be coupled to the upper surface of the lower panel 100 along the rim of the lower panel 100. In addition, the lower panel 100 may be watertight (e.g., have a water seal).

At least one transverse member 200 may be disposed on the lower panel 100, and may increase the transverse rigidity of the battery case. To further increase the transverse rigidity of the battery case, a plurality of transverse members 200 may be disposed on the lower panel 100. In addition, the transverse member 200 may be formed of an aluminum material.

At least one longitudinal member 300 may be disposed on the lower panel 100, and may increase the longitudinal rigidity of the battery case. To further increase the longitudinal rigidity of the battery case, a plurality of longitudinal members 300 may be disposed on the lower panel 100. In particular, the transverse member 200 may be formed of an aluminum material. A battery accommodation space may be defined between the transverse member 200 and the longitudinal member 300, and a battery cell may be mounted in the battery accommodation space.

As illustrated in FIG. 2, the vehicle battery case according to the exemplary embodiment of the present invention may further include the auxiliary transverse member 210 at a position spaced apart from the battery accommodation space by a predetermined distance towards the rear end of the vehicle. In addition, the vehicle battery case may further include the auxiliary longitudinal members 310 disposed between the battery accommodation space and the auxiliary transverse member 210 and between the battery accommodation space and the sidewall member 400. Accordingly, in the present invention, since the auxiliary transverse member 210 may be disposed at a position spaced apart from the battery accommodation space by a predetermined position towards the rear end of the vehicle and the auxiliary longitudinal members 310 may be disposed between the battery accommodation space and the auxiliary transverse member 210, when a collision occurs at the rear of the vehicle, the auxiliary transverse member 210 and the auxiliary longitudinal member 310 may primarily absorb collision shock, thus preventing the shock from being directly transferred to a battery accommodated within the battery accommodation space, thereby more effectively protecting the battery.

In addition, according to the exemplary embodiment of the present invention, as illustrated in FIG. 2, by disposing at least one transverse member 200 for increasing transverse rigidity and at least one longitudinal member 300 for increasing longitudinal rigidity within the battery case, it may be possible to achieve rigidity against a vehicle rear collision or a vehicle lateral collision with a compact structure. Further, a reduction in the weight and price of the battery case may be achieved compared to a conventional battery case, which requires a mounting bracket or the like to be mounted to the exterior of the battery case for achieving transverse rigidity or longitudinal rigidity and a cover or the like for protecting the mounting bracket.

Referring to FIG. 3, the longitudinal member 300 may be disposed above the transverse member 200. Particularly, the longitudinal member 300 and the transverse member 200 may be coupled to each other via metal inert gas (MIG) welding. The sidewall member 400, as illustrated in FIG. 2, may be attached to the upper surface of the lower panel 100 along the rim of the lower panel 100. The lower panel 100 and the sidewall member 400, as illustrated in FIG. 5, may be coupled to each other via friction stir welding (FSW). After the sidewall member 400 and the lower panel 100 are coupled to each other via FSW, the battery may be accommodated within the battery accommodation space, and then, the upper end of the sidewall member 400 may be coupled to the underside of the vehicle floor. In particular, the sidewall member 400 may be coupled to the underside of the vehicle floor via bolting or the like, but is not limited thereto, and the upper end of the sidewall member 400 may be coupled to the underside of the vehicle floor via various types of coupling methods.

The lower panel 100 and the sidewall member 400 may be watertight. In other words, the connection or coupling between the components provides a watertight seal. Accordingly, external foreign substances and moisture may be prevented from being introduced into the battery, which may further increase the durability of the battery. Additionally, the sidewall member 400 may include a rim portion 410 attached along the rim of the lower panel 100 and having a predetermined height, a first rigid member 420 attached to at least a portion of the longitudinal side of the rim portion 410, and a second rigid member 430 attached to at least a portion of the transverse side of the rim portion 410. In some exemplary embodiments, two first rigid members 420 may be coupled to respective longitudinal sides of the rim portion 410, as illustrated in FIG. 2.

The first rigid member 420 may be formed with a coupling portion, which may be coupled to the underside of the vehicle floor. For example, when the sidewall member 400 is bolted to the underside of the vehicle floor, the first rigid member 420 may be formed with bores, into which bolts may be inserted. The second rigid member 430 may be coupled to the transverse side, more particularly, the transverse side of the rim portion 410 on the vehicle rear side. In particular, the first rigid member 420, the second rigid member 430, and the rim portion 410 may be coupled to each other via MIG welding, as illustrated in FIG. 4.

As described above, in the sidewall member 400 of the battery case according to the exemplary embodiment of the present invention, since the first rigid members 420 may be coupled to opposite longitudinal sides of the rim portion 410 and the second rigid member 430 may be coupled to the transverse side of the rim portion 410 on the vehicle rear side, when the vehicle is involved in a lateral or rear-end collision, the first rigid members 420 and the second rigid member 430 may primarily absorb collision shock, thus preventing the shock from being directly transferred to a battery accommodated in the battery accommodation space and more effectively protecting the battery.

As is apparent from the above description, according to the present invention, by forming a vehicle battery case using an aluminum material, it may be possible to reduce the overall weight of the battery case, and consequently to increase the driving distance of a vehicle. In addition, by providing at least one transverse member for increasing transverse rigidity and at least one longitudinal member for increasing longitudinal rigidity within the battery case, it may be possible to increase the rigidity of the battery case without requiring a separate mounting bracket or the like to the exterior of the battery case. In addition, by disposing an auxiliary transverse member on the vehicle rear side of the battery case and disposing auxiliary longitudinal members between a battery accommodation space and the auxiliary transverse member and between the battery accommodation space and a sidewall member, it may be possible to increase rigidity and thus improve the ability to withstand lateral and rear-end collisions.

Although the exemplary embodiments of the present invention have been described above with reference to the accompanying drawings, those skilled in the art will appreciate that the present invention can be implemented in various other exemplary embodiments without changing the technical ideas or features thereof.

What is claimed is:

1. A battery case for a vehicle comprising:
   a lower panel;
   a plurality of transverse members disposed on the lower panel to increase transverse rigidity;
   at least one longitudinal member disposed on the lower panel to increase longitudinal rigidity, wherein the transverse members and the longitudinal member define a battery accommodation space therebetween;
   a sidewall member attached to an upper surface of the lower panel along an edge of the lower panel;
   an auxiliary transverse member disposed at a position spaced apart from the battery accommodation space by a predetermined distance toward a rear end of the vehicle; and
   at least two auxiliary longitudinal members formed between the battery accommodation space and the auxiliary transverse member and two other auxiliary longitudinal members formed between the battery accommodation space and the sidewall member,
   wherein the longitudinal member extends across the transverse members,
   wherein each of the auxiliary longitudinal members has a first end portion and a second end portion, the first end portion being connected to the battery accommodation space, and the second end portion of the at least two auxiliary longitudinal members being connected to the auxiliary transverse member and the second end portion of the two other auxiliary longitudinal members being connected to the sidewall member, and
   wherein the auxiliary longitudinal members and the auxiliary transverse member are disposed in the sidewall member.

2. The battery case according to claim 1, wherein the sidewall member has an upper end coupled to a floor of the vehicle.

3. The battery case according to claim 1, wherein the longitudinal member is disposed above the transverse members.

4. The battery case according to claim 3, wherein the longitudinal member and the transverse members are coupled to each other via metal inert gas (MIG) welding.

5. The battery case according to claim 1, wherein the sidewall member includes:
   a rim portion attached along the rim of the lower panel and having a predetermined height;
   a first rigid member attached to at least a portion of a longitudinal side of the rim portion; and
   a second rigid member attached to at least a portion of a transverse side of the rim portion.

6. The battery case according to claim 5, wherein the first rigid member and the second rigid member are coupled to the rim portion via MIG welding.

7. The battery case according to claim 1, wherein the lower panel and the sidewall member are coupled to each other via friction stir welding (FSW).

8. The battery case according to claim 1, wherein at least one of the group selected from: the lower panel, the transverse members, the longitudinal member, or the sidewall member is formed of an aluminum material.

* * * * *